Aug. 21, 1928.　　　　　　　　　　　　　　　　　　1,681,319
L. G. BARTLETT
MOTOR VEHICLE
Filed April 6, 1922　　　　4 Sheets-Sheet 3
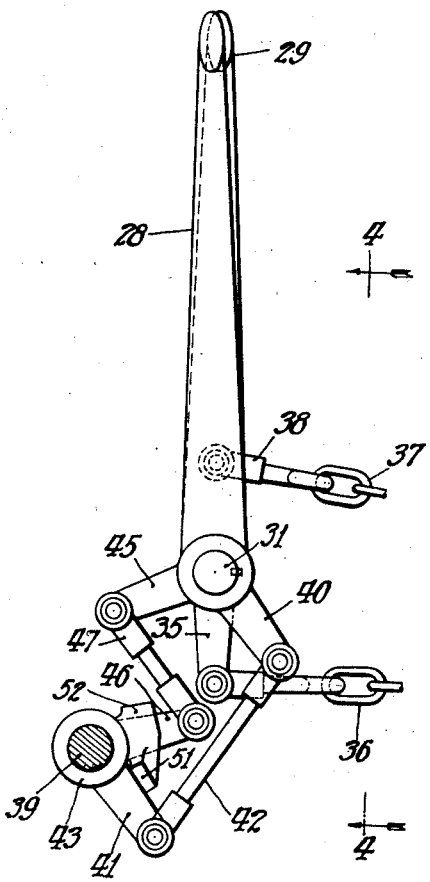
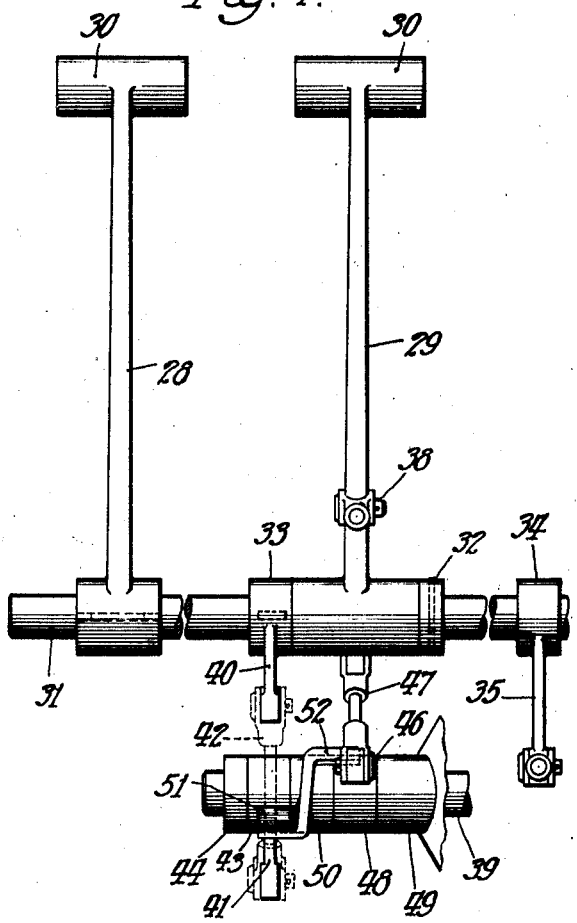
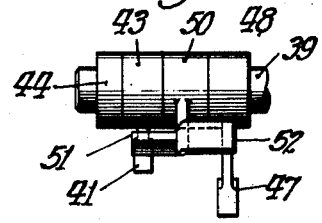
Inventor
Linton G. Bartlett

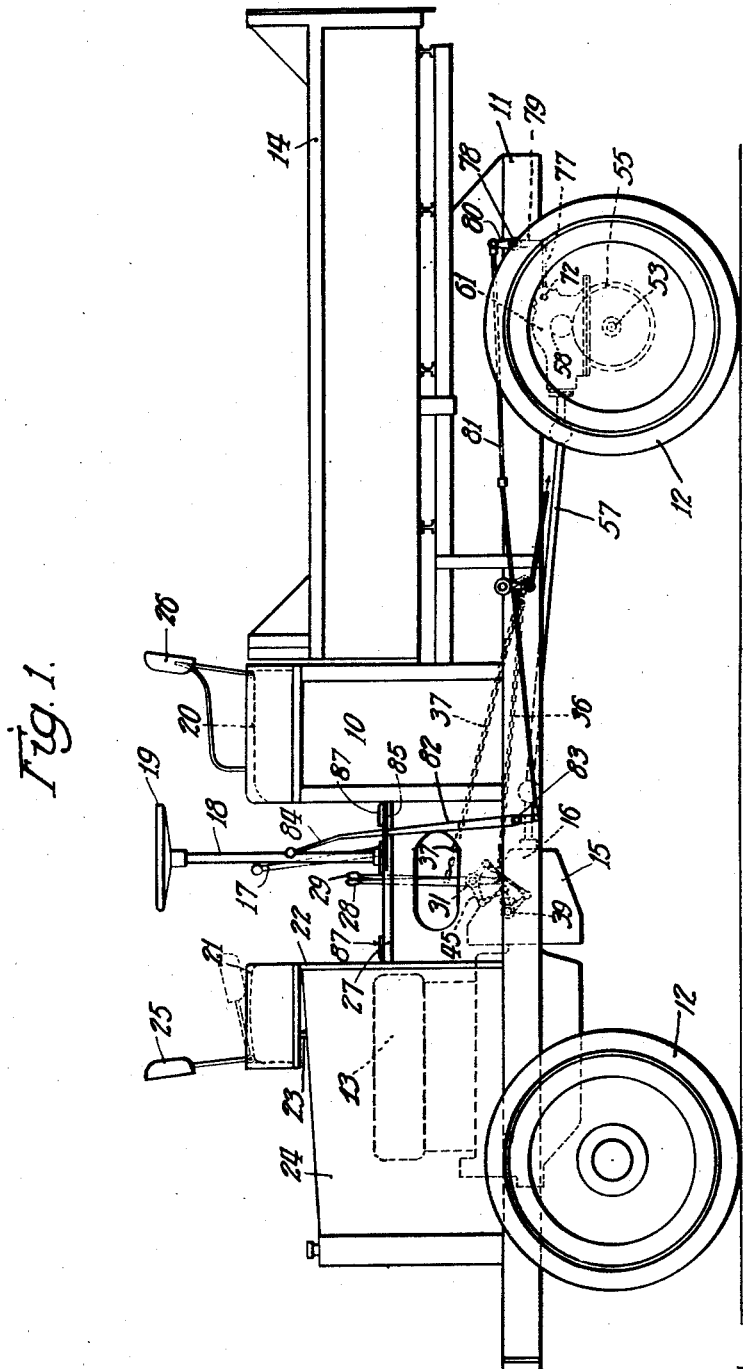

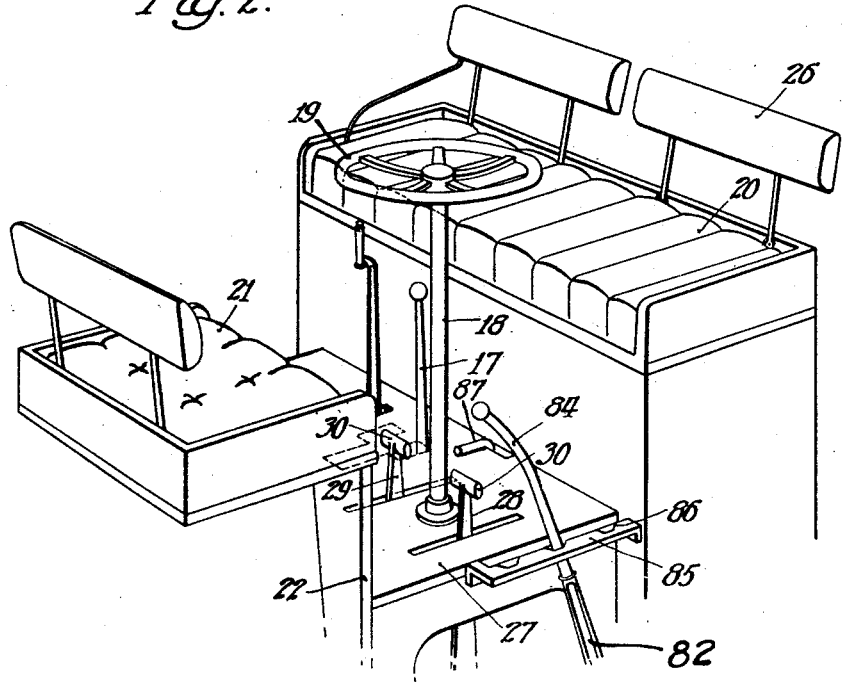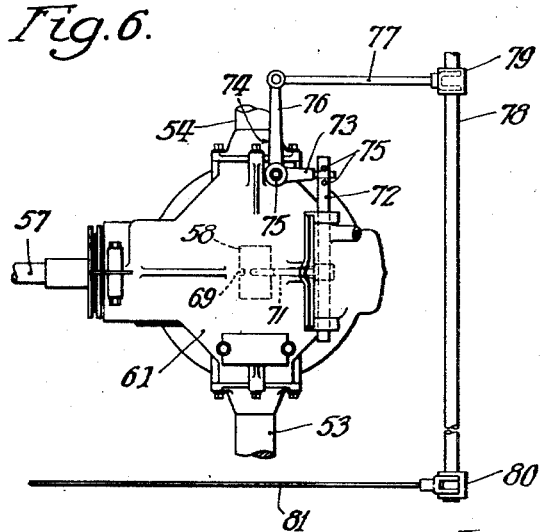

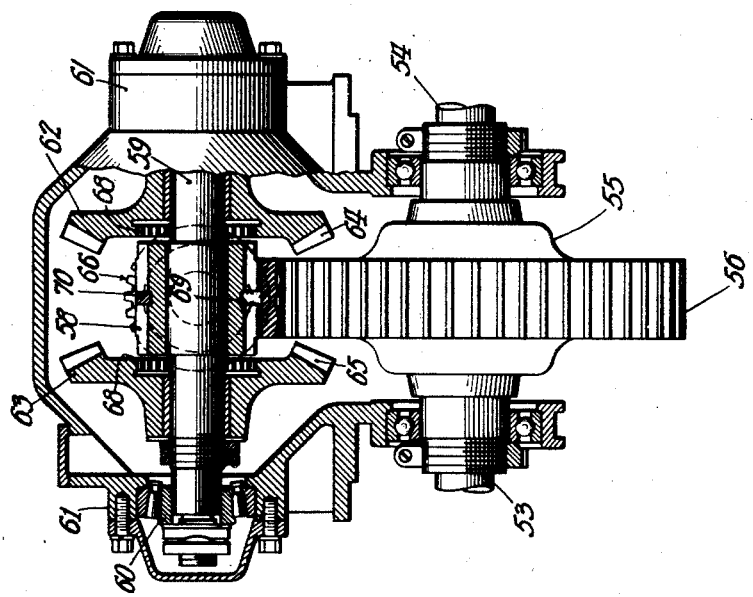
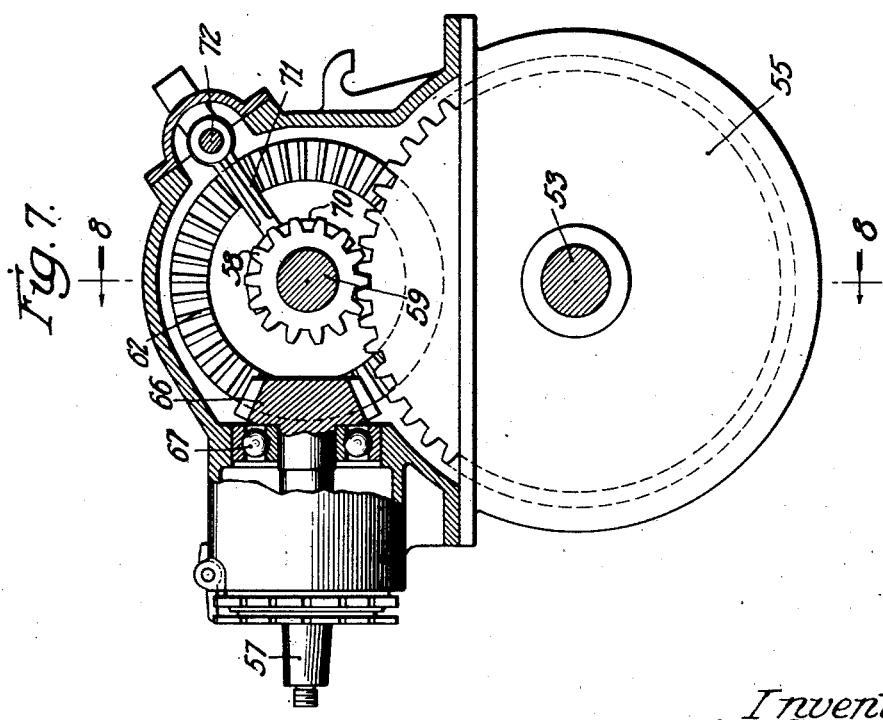

Patented Aug. 21, 1928.

1,681,319

UNITED STATES PATENT OFFICE.

LINTON G. BARTLETT, OF WAUKEGAN, ILLINOIS, ASSIGNOR TO WILLIAM L. O'CONNELL, OF CHICAGO, ILLINOIS.

MOTOR VEHICLE.

Application filed April 6, 1922. Serial No. 549,997.

This invention relates to motor vehicles and particularly to motor trucks.

Among other objects, the invention is intended to provide improved controlling mechanisms for a motor vehicle which increase the usefulness of the vehicle and enable it to be controlled with greater facility, particularly in driving backward.

The invention consists in the novel combinations, constructions, and arrangements, hereinafter described or claimed, for accomplishing the above stated objects and such other objects as will hereinafter appear.

The character of the invention may be best understood by reference to one illustrative construction embodying the invention and shown in the accompanying drawings.

In said drawings:

Fig. 1 is a side elevation of a motor vehicle.

Fig. 2 is a perspective view of the seat arrangement and controls.

Fig. 3 is a side elevation of the foot levers.

Fig. 4 is a rear elevation of these levers.

Fig. 5 is a fragmentary plan view of a portion of the clutch shaft and operating mechanism.

Fig. 6 is a plan view of the differential and certain control mechanism.

Fig. 7 is a cross-section of the differential.

Fig. 8 is an elevation, partly in section, of the differential.

In the drawings, 10 designates a motor vehicle such, for example, as a motor truck having the usual frame 11, wheels 12, engine 13, and body 14. The body 14 may, if desired, be a tilting body of any approved construction.

For the purpose of illustration, I have shown a truck driven by an internal combustion engine power unit which is controlled by certain typical control mechanism hereinafter described. However, it will be obvious that certain features of the invention may also be embodied in a vehicle having a different type of power unit, such as an electric motor and storage cells.

The power unit is provided with a suitable clutch 15 and transmission 16 for the usual purposes. The transmission which is of any appropriate type may, if desired, be provided with three speeds forward and one speed in reverse, and be controlled by the usual transmission or gear shift lever 17. Any suitable devices may be employed.

Steering mechanism of any appropriate design may be employed. I have illustrated a vertical steering post 18 having a steering wheel 19 mounted thereon. The steering wheel is conveniently located with respect to the seat 20. For the purposes hereinafter pointed out, a seat 21 is positioned opposite the seat 20 and conveniently located with respect to the steering wheel 19. This seat may be supported in any appropriate manner. In the illustrative construction, the front edge of the seat 21 is supported at the upper edge of the instrument board 22 and the rear edge is supported by a suitable post 23 which runs through the hood 24 to the frame of the machine. Preferably the back 25 of the seat 21 and the back 26 of that portion of the usual seat 20, customarily occupied by the driver, are hinged to be capable of being folded down when not in use, so as not to obscure the vision of the driver when driving in either direction.

The arrangement of the control mechanism is such that when it is desired to drive the vehicle backward, the driver may occupy the seat 21 facing toward the rear. The control devices, particularly those operated by the feet of the driver for controlling certain instrumentalities occupy the same position relative to the driver, irrespective of the seat he occupies in driving. The gear shift lever 17 in the present embodiment is an exception to this arrangement. In driving forward it is operated by the right hand of the driver and in driving backward, when he occupies the seat 21, it is operated by his left hand.

Obviously, however, when different types of power units are employed, the transmission may be entirely dispensed with and different forms of, or equivalent, speed-change devices employed.

Means are provided for enabling the driver to employ the same movements in controlling the vehicle irrespective of the seat he occupies. In the particular embodiment illustrated, this is effected by giving to the foot levers dual functions, one function being operative when driving in one direction and the other function operative when driving in the reverse direction.

Passing through the floor board 27 are a pair of foot levers 28 and 29 having suitable foot pedals 30 intended to be operated by the right and left feet of the driver respectively, whether he occupies the seat 20 or the seat 21. In an internal combustion unit these levers usually control the clutch and the brakes. The arrangement is such that in driving in one direction one lever controls the brake and the other controls the clutch, but in driving in the opposite direction the functions of these levers are reversed. By this means the same foot of the driver always operates the same instrumentality whether he occupies the seat 20 or the seat 21.

The levers 28 and 29 extend to a transverse horizontal shaft 31 below the floor board. The lever 28 is keyed or otherwise fixed to the shaft 31 so as to transmit movement thereto. The lever 29 is loosely mounted and capable of free rotation thereon, and is held against longitudinal movement on the shaft by the collar 32 at one end and the member 33 at the other end. The collar 32 is pinned, or otherwise secured, to the shaft and the member 33 is preferably keyed thereto for the purpose hereinafter pointed out. Also keyed to the shaft is a member 34 having an arm 35 extending downward therefrom. From this arm a tension element, such as a chain 36, extends to the brakes or brake mechanism. The arm 35 may, therefore, be operated, through the shaft 31, by the lever 28. Another tension element, such as a chain 37, also connected with the brake mechanism similarly to the chain 36, is connected at 38 with the lever 29 intermediate its end and pivot point.

It is obvious that by this arrangement the lever 29 operates the brakes through the element 37 only when it is pushed forward or toward the front end of the vehicle, and the lever 28 operates the brakes through the element 36 only when it is pushed to the rear. When these levers are moved in directions opposite to those referred to, the elements 37 and 36 become slack and do not function.

The operation of these levers in reverse directions beyond their normal positions controls the clutch, as will be pointed out. The clutch shaft 39 is connected with the clutch 15 through the usual clutch yoke, not shown. The particular clutch forms no part of this invention. The member 33, keyed to the shaft 31, is provided with an arm 40, which is connected with another arm 41 through a link 42. The arm 41 is carried by a member 43 mounted loosely on the shaft 39 and held in place at one end by a collar 44. The lever 29, mounted loosely on shaft 31, is provided with an arm 45 connected with another arm 46 through the link 47. The arm 46 extends from a member 48 mounted loosely on shaft 39 and held from longitudinal movement thereon by the member 49. Secured to the shaft 39, and between members 43 and 48, is a collar 50 having lugs or stops 51 and 52 extending therefrom and into the path of movement of the arms 41 and 46 respectively. The rotation of the collar 50 in a counter-clockwise direction, as viewed in Fig. 3, rotates the shaft 39 to release the clutch. Preferably the clutch is of the type which normally remains engaged.

The forward movement of the lever 28 brings the arm 41, connected with the arm 40 by a link 42, into engagement with the stop 51, and rotates the shaft 39 in a counter-clockwise direction to release the clutch. It was noted above that this movement of the lever 28 is ineffective to control the brakes. The movement of the lever 29 to the rear brings the arm 46, connected thereto by the link 45 and arm 47, into engagement with the stop 52, and rotates the shaft 39 in a counter-clockwise direction to release the clutch. The movement of this lever in this direction is ineffective to control the brakes.

By means of this arrangement the habitual movements of the driver in controlling the clutch and brakes are the same whether the driver occupies the seat 20 or the seat 21 in driving.

Suitable mechanism is provided by means of which the speed changes of the ordinary transmission may be utilized also in driving the vehicle in the reverse direction. The ordinary transmission is constructed to permit a plurality of forward speeds, but only one slow speed in reverse.

This result may be accomplished in one way, among others, by reversing at desired times the normal relative rotation between that of the crank shaft and the driving axle. In the particular embodiment shown in the drawings, this reversal of relative rotation takes place between the propeller shaft and the driving axle.

In Figs. 7 and 8 is illustrated one of a number of typical differentials and speed reduction devices which may be constructed to permit the reversal of the relative rotation above referred to. Obviously, other types of differentials may be employed to accomplish the same result. The driving axles 53 and 54 extend from the rear wheels in the usual manner to the differential 55. The bull gear 56 is driven by the propeller shaft 57 extending from the transmission, thus driving the rear wheels. The particular means of operatively connecting the propeller shaft and the differential may be varied to suit the requirements. In trucks, and the like, usually a greater speed reduction is effected between the propeller shaft and the differential than in lighter vehicles. In the arrangement shown, the gear 56 is a spur gear which meshes with a spur pinion 58 mounted loosely on a shaft 59. Preferably the shaft 59 is mounted in suitable bearings 60 carried by the housing 61. Also mounted loosely on the shaft 59 are a pair of bevel gears 62 and 63 having their adjacent faces provided with bevel gear teeth 64 and 65. These gear teeth mesh with the bevel pinion 66 at the end of the propeller shaft 57. The propeller shaft 57 is provided with suitable bearings 67. Obviously, the pinion 66 rotates the gears 62 and 63 in opposite directions on the shaft 59. These gears are spaced apart sufficiently so as not to interfere with or engage the pinion 58 when it occupies a position midway between them. Each gear, 62 and 63, is provided with a plurality of internal teeth 68, similar to gear teeth, and arranged to enter the spaces between the teeth on the pinion 58, when it is moved along the shaft 59, in either direction from its middle or neutral position. This arrangement is similar to a series of clutch teeth and enables the engagement of the pinion 58 with either the gear 62 or the gear 63 to transmit rotation therefrom to the gear 56. Obviously, when the pinion 58 is moved so that its teeth engage the teeth 68 on the gear 62, the differential gear 56 is rotated in a direction opposite to that resulting from a driving engagement of the pinion 58 with the gear 63. By shifting the pinion 58 from engagement with one bevel gear to engagement with the other, a reversal of the relative rotation of the crank shaft and driving axles may be effected. Likewise, by placing the pinion in its neutral position, the propeller shaft is operatively disconnected from the driving axles and does not transmit rotation thereto in either direction.

A removable case is provided to surround the differential and exclude dirt.

Means is provided for shifting the pinion 58, as described. In the arrangement shown, the pinion is provided with a groove 69 for receiving a shifting yoke 70 carried on the arm 71. The arm 71 is carried on a shift rod 72 supported by the housing 61 and passing out of the same at one end. At this end the rod is connected with one arm 73 of a bell crank lever 74. This connection may be effected in any desirable manner. As illustrated, the arm 73 extends between a pair of pins 75 on the rod 72, spaced apart sufficiently to permit a slight amount of play necessitated by the varying angularity of the arm 73 relative to the rod 72. The bell crank lever 74 is pivoted at 75 and connected through its other arm 76 with a connecting link 77. The other end of the connecting link is connected with a rock shaft 78 through a depending arm 79. The rock shaft 79 extends across the frame of the vehicle near the rear end thereof, and is provided at one end with an upwardly extending rock arm 80 to which is connected a rod 81. The rod 81 extends to the forward end of the vehicle and is connected to a controlling lever 82 pivoted at 83. The controlling lever is provided with a handle 84 which may be conveniently grasped by the driver in either driving position. A notched bar or rack 85 having three notches 86 therein is provided for enabling the driver to set and hold the pinion 58 either in one or the other driving position, or in the neutral position above referred to.

Assuming that the propeller shaft rotates in a clockwise direction, as viewed from the front end, the lever 84 is placed in the forward notch 86 for driving forward in the normal manner, and in the rear notch 86 for driving to the rear, when it is desired to employ the plurality of speeds of the transmission. However, if desired, the reverse position of the transmission lever may still be employed in the usual manner in driving backward.

In driving in the reverse direction the driver may occupy, for greater convenience, the seat 21 and operate the levers 28 and 29 in the habitual manner to control the brake and clutch respectively. By employing the gear shift lever 17, all of the speed variation possible, when driving forward in the usual manner, is available in driving backward. In driving to the rear, the gear shift lever is operated by the left hand, in the particular arrangement shown, and with the right hand when driving in a forward direction. It has been observed that the movements to which one hand has been accustomed, when operating the gear shift lever, in no wise confuse the driver when performing a different series of operations with the other hand. In other words, the driver is accustomed to a certain set of movements for operating the gear shift lever with the right hand and to a different set of movements when operating it with a different hand, the left hand. Since different hands are employed, it has not been found to be confusing to accustom the hands to different movements in operating the gear shift lever.

Foot accelerators 87 for throttle control are provided for each driving position. The particular arrangement, position, and type of accelerator pedal may be varied to suit convenience and the particular vehicle employed. It is desirable, however, to place the pedals, in each driving position, in the same position relative to the driver. Thus the habitual movements of the driver in controlling the accelerator pedal and its location relative to the other controls are the same in each driving position. In the arrangement shown, the acelerator pedal is moved to the left in opening the throttle of the carburetor.

The particular illustrative truck is especially convenient for use in road-building operations. Road-building trucks are usually provided with a dumping body and intended to convey crushed stone, gravel, concrete, or other materials to and from the various mixers or machines employed in road-building. In the usual practice, the truck is driven to the mixers, turned around, and backed into position for dumping or receiving a load either at the mixer or elsewhere. It has been found especially difficult and objectionable to turn the trucks, owing to their great weight and small steering angle, on the uncompleted roads. Usually this requires frequent backing and turning, during which the foundation of the road is cut up and damaged.

Turntables for turning the trucks are frequently employed to avoid this but these are cumbersome and must be moved frequently, though with great difficulty, so as to be positioned reasonably close to the actual destination of the truck. Moreover, with either of the old methods of handling the trucks, much time is wasted because of the slow backward travel of the truck and the congestion occasioned by blocking the road and the delay in discharging the contents of a given truck.

With the arrangement illustrated, the truck may be turned around on good solid road, even though a considerable distance away, and driven backward at high speed, if need be, into the position at which it discharges or receives its contents. In driving in the reverse direction, the driver occupies for convenience the seat 21, shifts the lever 84 to the reverse position, and drives backward quite as conveniently, and with as great facility, as in driving forward in the ordinary manner. While the steering of the truck is effected by the steering of what are then rear wheels, I have not observed that there is any confusion or serious difficulty in driving the vehicle in this manner. The entirely different relative position in which the driver finds himself (at the rear instead of the front) entirely neutralizes or prevents the suggestive influence of habitual or unconscious steering movements employed when driving in a forward direction.

The truck proceeds to the position at which it discharges or receives its contents without turning around or cutting up the roadway. When the truck is again ready to proceed, the driver shifts the lever 84, changes his position to the seat 20 and drives forward in the ordinary manner, again without turning the truck around or cutting back and forth.

The arrangement, which permits the operative disconnection of the propeller shaft or equivalent driving means from the driving axle, enables the use of the propeller shaft independently to deliver power to other devices such, for example, as concrete mixers. This arrangement may be embodied in a vehicle with or without means for effecting an actual reversal of relative rotation between the propeller shaft and the driving axles. Power may be taken from the propeller shaft in any desired manner such, for example, as gears driven by the propeller shaft. Because the power is taken from a point beyond the transmission, the latter may be employed to effect a variation in the relative rates of rotation of the engine and propeller shaft either to change the speed of the driving device or to increase the driving torque.

It is clear from the foregoing description that the principles of the invention may be employed in connection with other types of power units, such as an electric power unit, which require different controlling instrumentalities. Typical controls for such units may be constructed and arranged in accordance with the principles herein pointed out. Obviously, the invention is not limited to the details of construction illustrated and described. Moreover, it is not indispensable that all features of the invention be used conjointly as they may be employed to advantage in various different combinations and sub-combinations.

Having thus described my invention, I claim:

1. In a motor vehicle, the combination comprising a pair of foot levers arranged to be operated by the right and left feet respectively of the driver, oppositely located driving seats conveniently arranged for operation of said foot levers, and mechanism associated with said levers and the clutch and brakes whereby the foot lever, occupying respectively a definite position relative to the driver when driving from either seat, operates the same instrumentality.

2. In a motor vehicle, the combination comprising a pair of foot levers arranged to be operated by the right and left feet respectively of the driver, oppositely located driving seats conveniently arranged for operation of said foot levers, and mechanism associated with said levers and the clutch and brakes, whereby the lever operating the clutch and the lever operating the brakes occupy the same relation to the feet of the driver whether driving from one driving seat or the other.

3. In a motor vehicle, the combination comprising a pair of foot levers arranged to be operated by the right and left feet respectively of the driver, oppositely located driving seats conveniently arranged for operation of said foot levers, and mechanism associated with each lever to enable the same to operate the clutch when moved in one direction and the brakes when moved in the opposite direction.

4. In a motor vehicle, the combination comprising a pair of foot levers arranged to be operated by the right and left feet respectively of the driver, oppositely located driving seats conveniently arranged for operation of said foot levers and mechanism associated with said levers and the clutch, and brakes whereby the lever intended to be operated by the right foot of the driver controls the brakes, and the lever intended to be operated by the left foot of the driver operates the clutch whether the driver drives from one driving seat or the other.

5. In a motor vehicle, the combination comprising a control lever, a flexible element connected with said lever for operating the brakes, and clutch operating means connected with said lever for operating the clutch when said lever is moved in a direction opposite to that for operating the brake.

6. In a motor vehicle, the combination comprising right and left control devices, means provided to enable the driver to face forward or to the rear of the vehicle in driving forward and backward respectively, and mechanism connecting said devices with the instrumentalities to be operated thereby, whereby the device at the right hand of the driver, whether facing in one direction or the other, operates the same instrumentality, and similarly the left-hand device.

7. In a motor vehicle, the combination comprising a clutch lever, a clutch shaft having an arm loosely mounted thereon and connected with said lever, a member fixed to said shaft and arranged to be engaged by said arm to rotate the shaft in one direction, said member permitting said arm to move freely in the opposite direction, vehicle brakes, and means connecting said lever and the brakes whereby the brakes are operated when said arm moves in said opposite direction.

8. In a motor vehicle, the combination comprising a foot lever, a clutch shaft having an arm loosely mounted thereon and connected with said lever, a member fixed to said shaft and arranged to be engaged by said arm when said lever is moved in one direction for operating said clutch shaft, vehicle brakes, a flexible element connecting said lever and the brakes, and arranged to operate the brakes when said lever is moved in the opposite direction.

9. A two-way drive truck comprising in combination a chassis carrying a truck body extending to the rear end thereof, truck driving and steering controls in front of said body and constructed and arranged to be conveniently available for manipulation by the driver whether facing forward or to the rear, said truck provided with forwardly and rearwardly facing driving positions on opposite sides of said controls whereby the driver may face forwardly when driving forward and rearwardly when driving to the rear, said driving controls including foot brake and clutch pedals arranged in a single row transversely of the truck in a position to be reached by the driver with equal facility whether driving forward or to the rear, whereby the truck may be readily driven backward by the use of the backward driving controls and with the driver facing to the rear to a discharge or loading position located in the direct line of travel of the truck and may then be driven directly forward from such point by manipulation of the forward driving controls with the driver facing forward.

10. In a motor vehicle, the combination comprising a chassis having a driving motor, a clutch associated therewith and constructed and arranged to make and break the driving connection between said motor and both driving wheels, braking means for retarding the travel of the vehicle, a pair of control devices adapted to operate the clutch and the braking means respectively, and means for connecting each of said control devices to both the braking means and clutch, whereby each device is capable of operating either the braking means or the clutch.

11. In a motor vehicle, the combination comprising a chassis having a driving motor, a clutch associated therewith for making and breaking the driving connection between said motor and both driving wheels, braking means for retarding the travel of the vehicle, a control lever constructed and arranged to operate the braking means and the clutch, and mechanism for connecting said lever to both said clutch and braking means so that a movement of said lever in one direction will operate the braking means but not the clutch and a movement of said lever in the opposite direction will operate the clutch but not the braking means, whereby said breaking means and clutch may be controlled independently of each other by said lever.

12. In a two-way drive motor vehicle, the combination comprising a chassis having a driving motor, a clutch associated therewith for making and breaking the driving connection between said motor and both driving wheels, braking means for retarding travel of the vehicle, a pair of foot levers adapted to be actuated to operate the braking means and clutch, and means for connecting each of said levers to both said clutch and braking means so that one movement of the lever will operate the braking means but not the clutch and a reverse movement of each lever will operate the clutch but not the braking means, whereby said foot lever may be operated from either side to control both the brakes and the clutch.

13. In a motor vehicle, the combination comprising a motor having a driving clutch associated therewith, braking means, a pair of foot levers arranged side by side, means for connecting each of said levers with the braking means and clutch respectively so that the forward movement of the left lever will operate the clutch and the forward movement of the right lever will operate the braking means and the rearward movement of the left lever will operate the braking means and the rearward movement of the right lever will operate the clutch.

14. A two-way drive truck comprising, in combination, a chassis having a motor for propelling said truck, a steering device in front of the truck body, said truck being constructed and arranged to provide oppositely facing driving positions on opposite sides of and adjacent said steering device, a single pair of control devices for controlling the vehicle between said driving positions and arranged to be manipulated by the driver from both of said driving positions, and means operatively connecting said control devices with said truck so that said truck may be controlled by said single pair of control devices from either driving position.

15. In a two-way drive truck, the combination comprising a truck chassis having a clutch, brake and steering device, a single pair of foot pedals located adjacent one end of the truck and in front of the truck body for operating the brakes and clutch, said truck being constructed and arranged to provide oppositely facing driving positions on opposite sides of said foot pedals, said steering device and both said foot pedals being constructed and arranged to be operated by the driver from both of said driving positions, and means operatively connecting said foot pedals with the brakes and clutch so that said single pair of pedals may be operated from either driving positions to control the brakes and clutch.

16. A two-way drive truck comprising in combination a chassis carrying a truck body extending to the rear end thereof, and having a motor connected with the wheels for driving the truck, truck driving and steering controls at the forward end of the truck in front of said body and constructed and arranged to be conveniently available for manipulation by the driver whether facing forward or to the rear, said truck provided with forwardly and rearwardly facing driving positions on opposite sides of said control whereby the driver may face forwardly when driving forward and rearwardly when driving to the rear, a transmission associated with the motor and having adjustments to provide a plurality of speed ratios between the motor and the truck, said transmission having a transmission control lever located adjacent said driving positions, means for reversing the driving connection between the motor and the wheels constructed and arranged to render the speed ratios of said transmission available for both forward and backward travel of the truck, said oppositely facing driving positions providing means for readily driving the truck backward to a discharge or loading point and for readily driving it away without turning the truck around.

17. A two-way drive truck comprising in combination a chassis having a driving motor and carrying a truck body extending to the rear end thereof, truck driving and steering controls in front of said body and constructed and arranged to be conveniently available for manipulation by the driver whether facing forward or to the rear, said truck being constructed and arranged to provide forwardly and rearwardly facing driving positions on opposite sides of said controls whereby the driver may face forwardly when driving forward and rearwardly when driving to the rear, a transmission having adjustments to provide a plurality of speed ratios between the motor and the truck, reversing means including a pair of gears adapted to be driven in opposite directions for reversing the driving connection between the motor and the truck, and a control lever adjacent said driving positions for shifting the driving connection from one gear to the other to reverse said driving connection between the motor and the truck.

In testimony whereof, I have signed my name to this specification.

LINTON G. BARTLETT.